United States Patent
Castro Castro et al.

(10) Patent No.: US 9,699,676 B2
(45) Date of Patent: Jul. 4, 2017

(54) POLICY CONTROLLER BASED NETWORK STATISTICS GENERATION

(75) Inventors: Fabian Castro Castro, Madrid (ES);
Susana Fernandez Alonso, Madrid (ES); Miguel Angel Muñoz de la Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 159 days.

(21) Appl. No.: 14/358,230

(22) PCT Filed: Nov. 15, 2011

(86) PCT No.: PCT/EP2011/070175
§ 371 (c)(1),
(2), (4) Date: May 15, 2014

(87) PCT Pub. No.: WO2013/071958
PCT Pub. Date: May 23, 2013

(65) Prior Publication Data
US 2014/0293824 A1    Oct. 2, 2014

(51) Int. Cl.
*H04L 12/26* (2006.01)
*H04W 24/08* (2009.01)
(Continued)

(52) U.S. Cl.
CPC ........... *H04W 24/08* (2013.01); *H04L 41/142* (2013.01); *H04W 24/02* (2013.01)

(58) Field of Classification Search
CPC .................. H04L 47/10; H04L 41/14; H04L 41/5032–41/5035; H04L 43/00–43/50;
(Continued)

(56) References Cited

U.S. PATENT DOCUMENTS

| 6,594,277 | B1 | 7/2003 | Chiang et al. |
| 7,890,473 | B1* | 2/2011 | Wyett ................. G06F 11/3409 |
| | | | 707/687 |
| 2010/0223375 | A1* | 9/2010 | Dehaan ............... H04L 41/0853 |
| | | | 709/224 |

FOREIGN PATENT DOCUMENTS

| JP | 2003244321 A | 8/2003 |
| JP | 2004363947 A | 12/2004 |

(Continued)

OTHER PUBLICATIONS

Third Generation Partnership Project, "3GPP TS 23.203 V11.1.0 (Mar. 2011)", 3rd Generation Partnership Project; Technical Specification Group Services and System Aspects; Policy and charging control architecture (Release 11). Mar. 2011. pp. 1-136.
(Continued)

*Primary Examiner* — Christopher R Crompton
(74) *Attorney, Agent, or Firm* — Murphy, Bilak & Homiller, PLLC

(57) ABSTRACT

In order to support generation of network statistics, a policy controller (30) of a mobile network may be provided with a network statistics generator (32) and with an interface (Ni) to a network intelligence function (60). The network statistics generator (32) may use these interfaces of the policy controller (30) for obtaining information needed to generate the network statistics. In addition, the network statistics generator (32) may also use information which is locally available at the policy controller (30). In other words, the policy controller (30) or one or more other nodes may act as sources of information for generating the network statistics. The network statistics generator (32) may select types of information to be used for compiling a certain network statistic and also suitably select nodes to be used as sources of information for obtaining these types of information. This
(Continued)

may for example be accomplished on the basis of a request received from the network intelligence function (60).

16 Claims, 6 Drawing Sheets

(51) Int. Cl.
*H04L 12/24* (2006.01)
*H04W 24/02* (2009.01)

(58) Field of Classification Search
CPC ..... H04W 24/00–24/10; G06F 11/30–11/3466
USPC ........................................................ 370/252
See application file for complete search history.

(56) References Cited

FOREIGN PATENT DOCUMENTS

| | | |
|---|---|---|
| JP | 2010537476 A | 12/2010 |
| RU | 2346399 C2 | 2/2009 |
| WO | 0047003 A1 | 8/2000 |
| WO | 2009008783 A1 | 1/2009 |
| WO | 2010034350 A1 | 4/2010 |
| WO | 2010128391 A2 | 11/2010 |

OTHER PUBLICATIONS

Third Generation Partnership Project, "3GPP TS 23.203 V11.2.0 (Jun. 2011)", 3rd Generation Partnership Project; Technical Specification Group Services and System Aspects; Policy and charging control architecture (Release 11). Jun. 2011. pp. 1-142.

* cited by examiner

POLICY CONTROLLER BASED NETWORK STATISTICS GENERATION

TECHNICAL FIELD

The present invention relates to methods for generating network statistics and to corresponding devices.

BACKGROUND

For operators of mobile networks it is beneficial to be aware of various types of information related to the performance of the mobile network, such as amounts of transmitted data in relation to certain network nodes, groups of users geographical area, or the like. For example, such information can be used as a basis for making operational decisions, e.g., investment decisions such as whether to invest in core or radio network infrastructure, in which locations to make investments in network infrastructure, or the like. Other examples of such operational decisions are product decisions, e.g., in the form of product offerings, subscriber monetization, market segmentation, or the like. The information may also be used to take decisions to address subscriber churn or prevent network disturbances, e.g., in the form of network congestions.

Gathering such information in a mobile network can also be referred to as network intelligence. Network intelligence may involve the capability to monitor operation of various network nodes, e.g., by inspecting data traffic, in order to gather the information and also the ability to take decisions on the basis of the gathered information. Network intelligence may be used as middleware to capture information and supply the captured information to network operator applications for bandwidth management, traffic shaping, policy management, charging and billing, service assurance, revenue assurance, or the like.

However, the information needed for network intelligence may need to be obtained from various types of network nodes which are not coordinated and may have different capabilities to provide parts of the needed information. This may result in duplication of information, a need to deal with different report formats, different time intervals for reporting information, or the like. For example, different types of nodes may provide different types of interfaces for reporting the information. Also, different nodes may need to be individually configured for providing parts of the information, which may result in significant signaling overhead and also affect performance of the nodes. This in turn may in turn prevent application of network intelligence to complex types of information.

Accordingly, there is a need for techniques which allow for efficiently generating network statistics of a mobile network.

SUMMARY

According to an embodiment of the invention, a method of providing a network statistic in a mobile network is provided. According to the method, a policy controller of the mobile network receives a request for generating a network statistic. The policy controller further selects, from a plurality of nodes, at least one node as source of information. In addition, the policy controller selects at least one type of information to be obtained. The policy controller obtains the selected type of information from the selected at least one node. Then the policy controller generates the requested network statistic on the basis of the obtained information and sends a report comprising the generated network statistic.

According to a further embodiment of the invention, a policy controller is provided. The policy controller comprises at least one interface for communication with nodes of the mobile network and/or other nodes, a network statistics interface, and a processor. The processor is configured to:
receive, via the network statistics interface, a request for generating a network statistic,
select, from a plurality of nodes, at least one node as source of information,
select at least one type of information to be obtained,
obtain the selected type of information from the selected at least one node,
generate the requested network statistic on the basis of the obtained information, and
send a report comprising the generated network statistic via the network statistics interface.

According to a further embodiment of the invention, a system for generating network statistics in a mobile network is provided. The system comprises a policy controller and a network intelligence node. In this system, the policy controller is configured to receive, from the network intelligence node, a request for generating a network statistic. Further, the policy controller is configured to select, from a plurality of nodes, at least one node as source of information and to select at least one type of information to be obtained. The policy controller is also configured to obtain the selected type of information from the selected at least one node. Moreover the policy controller is configured to generate the requested network statistic on the basis of the obtained information and send a report comprising the generated network statistic to the network intelligence node.

According to a further embodiment of the invention, a computer program product is provided, e.g., in the form of a data carrier or physical storage medium. The computer program product comprises program code to be executed by a processor of a policy controller of a mobile network, thereby configuring the policy controller to perform a method in which the policy controller receives a request for generating a network statistic; selects, from a plurality of nodes, at least one node as source of information; selects at least one type of information to be obtained; obtains the selected type of information from the selected at least one node; generates the requested network statistic on the basis of the obtained information; and sends a report comprising the generated network statistic.

According to further embodiments, other methods, devices, or computer program products for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts of generating network statistics in a mobile network. In particular, the concepts may be used to provide a network intelligence function with various types of network statistics. In the following, the concepts will be explained in the context of a 3GPP (Third Generation Partnership Project) mobile network. The mobile network may support one or more types of radio access technology (RAT), such as GSM (Global System for Mobile Communication), GSM EDGE (Enhanced Data Rates for GSM Evolution), UMTS (Universal Mobile Telecommunications System), and/or Evolved UMTS, also referred to as 3GPP LTE (Long Term Evolution). The mobile network may thus be equipped with one more corresponding types of radio access network, such as a GSM radio access network (GRAN), a GSM EDGE radio access network (GERAN), a UMTS radio access network (UTRAN), or an Evolved UTRAN (E-UTRAN). However, it is to be understood that the illustrated concepts may be applied in other types of mobile network as well, e.g., using other types of RAT such as RATs based on Code Division Multiple Access (CDMA) and that particular types of nodes described in the following may vary in accordance with the type of implemented RATs. Further, the concepts may also applied in a Fixed Mobile Convergence (FMC) scenario, i.e., in a mobile network which also supports fixed access, e.g., using Digital Subscriber Line (DSL) or coaxial cable access technologies.

Figure 1:
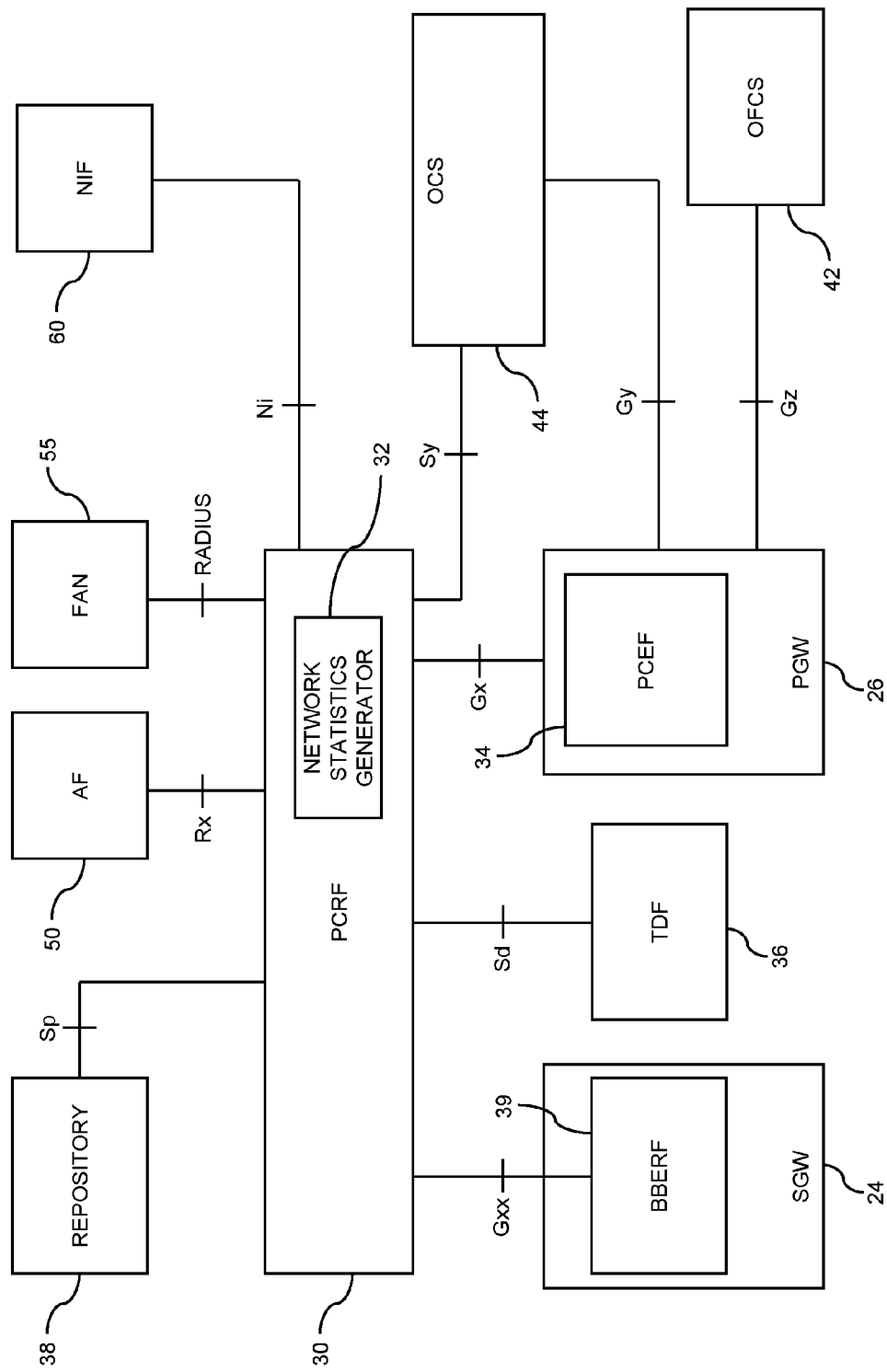
FIG. 1 schematically illustrates a Policy and Charging Control (PCC) architecture of a mobile network in which concepts of generating network statistics according to an embodiment of the invention are implemented.

FIG. 1 illustrates implementation of concepts according to an embodiment of the invention in a Policy and Charging Control (PCC) architecture according to the 3GPP Technical Specifications (TSs), e.g., 3GPP TS 23.203. As illustrated, the PCC architecture includes a first gateway 24, e.g., in the illustrated example implemented as a Serving Gateway (SGW), a second gateway 26, in the illustrated example implemented as a Packet Data Network Gateway (PGW) 26, a policy controller 30, in the illustrated example implemented as a Policy and Charging Rules Function (PCRF), and a repository 38. Further, the PCC architecture also includes a Policy Control Enforcement Function (PCEF) 34 which is implemented in the PGW 26. In the illustrated example, the repository 38 is assumed to correspond to a Subscriber Profile Repository (SPR). However, it is to be understood that other types of repository could be used as well, e.g., a User Data Repository (UDR). As illustrated, the PCC architecture may also include a Traffic Detection Function (TDF) 36, a Bearer Binding and Event Reporting Function (BBERF) 39 implemented in the SGW 24, an Offline Charging System (OFCS) 42, an Online Charging System (OCS) 44, an Application Function (AF) 50, and/or a fixed access network node (FAN) 55, e.g., an Authentication Authorization and Accounting (AAA) server or a Broadband Remote Access Server (BRAS) of a fixed access network.

The PCRF 30 is configured to perform policy control decision and flow based charging control. The PCRF 30 provides network control regarding detection of service data flows detection, gating, Quality of Service (QoS), and flow based charging towards the PCEF 34. For this purpose, the PCRF 30 may signal PCC rules to the PCEF 34. The PCEF 34 may be configured to perform service data flow detection, policy enforcement and flow based charging functionalities, which is typically accomplished by applying the PCC rules as signaled by the PCRF 30. Further, the PCEF 34 may also implement functionalities of packet inspection, such as Deep Packet Inspection (DPI), and service classification. In this way data packets may be classified according to PCC rules defined in the PCEF 34 and be assigned to a certain service.

The PCEF 34 may be responsible for enforcing policies with respect to authentication of subscribers, authorization to access and services, and accounting and mobility. The PCRF 30 may be responsible for managing individual policies defining network, application, and subscriber conditions that must be met in order to successfully deliver a service or maintain the QoS of a given service. The repository 38, which may be a standalone database or integrated into an existing subscriber database such as a Home Subscriber Server (HSS), may include information such as entitlements, rate plans, etc. The repository 38 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a subscriber category, e.g., whether the subscriber is a gold user to be provided with a high QoS or a silver or bronze user to be provided with lower QoS.

The AF 50 is an element offering one or more applications in which a service can be delivered in a network layer which is different from a network layer in which the service was requested. For example, the service can be requested in the signaling layer and delivered in the transport layer. Examples of AFs are functions of an IP Multimedia Subsystem (IMS) of the mobile network, such as a Proxy Call Session Control Function (P-CSCF), or application servers such as a Session Initiation Protocol (SIP) application server. The AF 50 typically communicates with the PCRF 30 to transfer session information, e.g., description of data to be delivered in the transport layer.

The TDF 36 may support packet inspection and service classification, e.g., by performing Deep Packet Inspection (DPI). For this purpose, Internet Protocol (IP) data packets may be classified according to a rules configured in the TDF 36 so that the data packets can be assigned to a certain type of service. The PCRF 30 can then control the provision of appropriate network resources for this service, e.g., by installing or configuring corresponding PCC rules in the PCEF 34. The TDF 36 can be implemented as a standalone node or can be integrated in another network node, e.g., in a gateway such as the SGW 26. In the latter example, the TDF 36 would be co-located with the PCEF 34. According to some embodiments, the TDF 36 may also act as a probe for collecting information on traffic transferred through the mobile network, e.g., by tracking used network resources on the basis of Uniform Resource Locators (URLs) or Inform Resource Identifiers (URIs) in inspected data packets.

Figure 2:
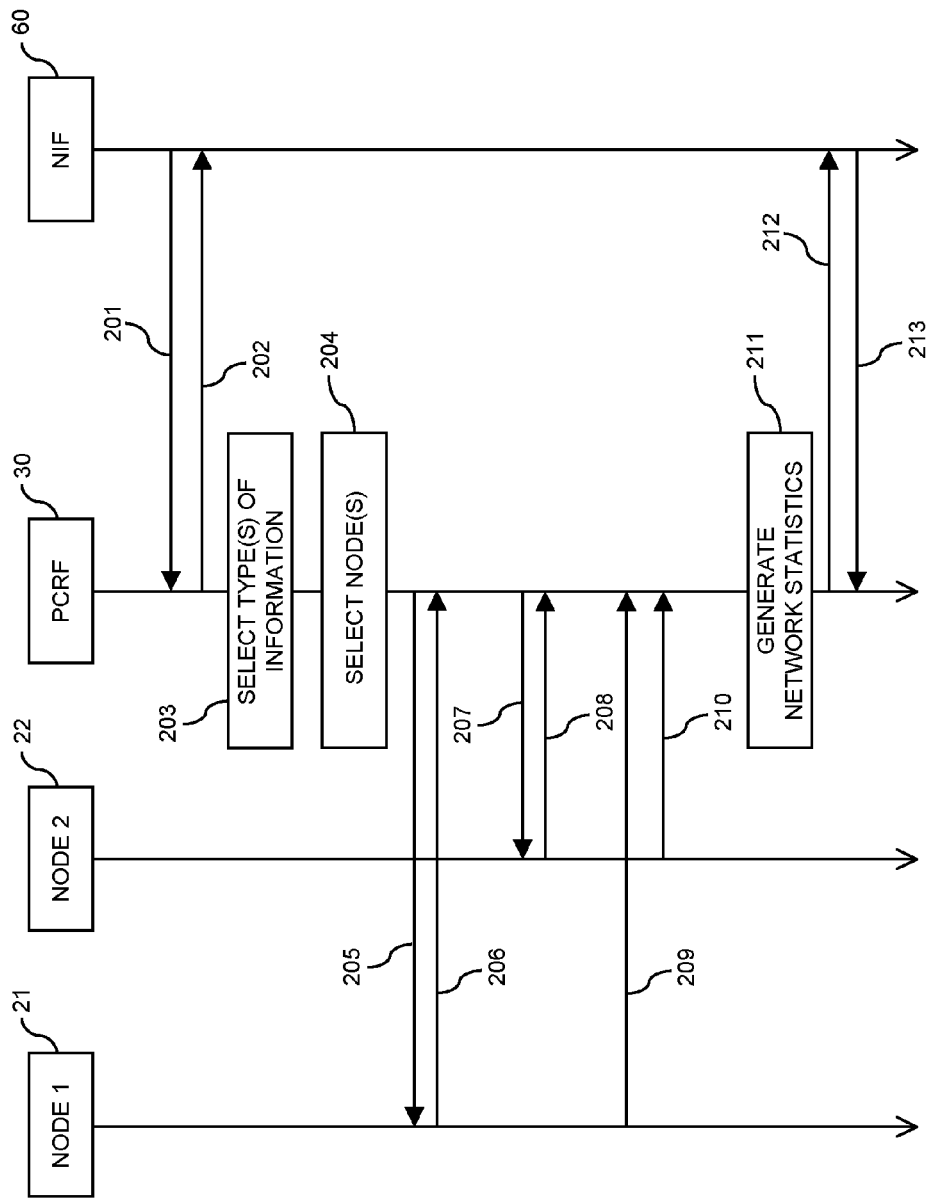
FIG. 2 shows a signaling diagram for illustrating a process of generating network statistics according to an embodiment of the invention.

As further illustrated in FIG. 2, the nodes of the PCC architecture are coupled to each other by interfaces or reference points termed as Gx, Gxx, Gy, Gz, Sd, Sp, Sy, Rx, and RADIUS. The Gx reference point resides between the PCRF 30 and the gateway 26, and allows for communication between the PCRF 30 and the PCEF 34. The Gxx reference point resides between the PCRF 30 and the BBERF 39. The Gy reference point resides between the gateway 26 and the OCS 44. The Gz reference point resides between the PGW 26 and the OFCS 42. The Rx reference point resides between the AF 50 and the PCRF 30. The Sd reference point resides between the TDF 36 and the PCRF 30. The Sp reference point resides between the repository 38 and the PCRF 30. The Sy reference point resides between the OCS 42 and the PCRF 30. The FAN 55 and the PCRF 30 are coupled to each other via the RADIUS interface, i.e., an interface based on the RADIUS (Remote Authentication Dial-In User Service) or Diameter protocol. Details concerning the implementation of these interfaces and protocols can be found in the 3GPP TSs, e.g., 3GPP TS 23.203 and 3GPP TS 29.212, and in IETF RFCs 2865, 2866, and 3588. It is to be understood that the PCC architecture of FIG. 1 is intended to show exemplary elements which may be involved in implementation of embodiments of the invention, but that also other elements could be involved in implementation of embodiments of the invention. For example, the PCC architecture of FIG. 1 could be modified with respect to the nodes interfaced to the PCRF 30 and the respective interfaces. For example, the repository 38 could be implemented as a UDR and the interface of the repository 38 to the PCRF 30 could be implemented by the Ud reference point. Also, the PCC architecture could include a V-PCRF (Visited PCRF) to be used for users which are roaming, and the PCRF 30 could be provided with an interface to the V-PCRF, e.g., implemented by the S9 reference point. Moreover, it is to be understood that multiple instances of some nodes may be provided, e.g., multiple SGWs and corresponding BBERFs, multiple PGWs and corresponding PCEFs, multiple TDFs, multiple AFs, or multiple FANs.

In the illustrated embodiment, the PCRF 30 is provided with a network statistics generator 32 and with an interface Ni to a Network Intelligence Function (NIF) 60. The Ni interface may for example be based on an Extended Markup Language (XML) template for messages transmitted between the PCRF 30 and the NIF 60. The network statistics generator 32 has the purpose of generating various types of network statistics, which can then be reported to the NIF 60 via the interface Ni. Here, it is to be understood that the network statistics generator does not need to be implemented as a dedicated physical structure of the PCRF 30, but may correspond to certain functionalities of the PCRF 30, which may also be implemented by software, e.g., program code to be executed by a processor of the PCRF 30. Accordingly, in the following description functionalities of the network statistics generator 32 will also be described as functionalities of the PCRF 30. The NIF 60 may in turn analyze or store the network statistics. This processing may in some cases result in decisions to change one or more of the policies and profiles configured in the PCRF 30 or repository 38. For example, it may occur that the operator decides to change QoS levels assigned to certain user profiles because the network statistics indicate a certain usage pattern.

Since the PCRF 30 is equipped with interfaces to a number of different nodes, the network statistics generator 32 of the PCRF 30 may use these interfaces for obtaining information needed to generate the network statistics. In addition, the network statistics generator 32 may also use information which is locally available at the PCRF 30. In other words, the PCRF 30 or one or more other nodes may act as sources of information for generating the network statistics. The network statistics generator 32 may select types of information to be used for compiling certain network statistic and also suitably select nodes to be used as sources of information for obtaining these types of information. This may for example be accomplished on the basis of a request received from the NIF 60.

Accordingly, PCRF 30 may act as a central decision point to coordinate and compile network statistics. This may involve using information from the transport plane, e.g., as available from transport nodes such as the SGW 24 or the PGW 26, in particular from the PCEF 34, the TDF 36, and/or the BBERF 39, information from the application plane, e.g., as available from AF nodes such as the AF 50, and/or information from the user plane, e.g., as available from the repository 38 or the OCS 44. This is possible because the PCRF 30 is a central network node where network, application and user information is managed to take intelligent access, QoS and charging decisions. The PCRF 30 is located between the application plane and the transport plane receiving information from AF nodes and transport nodes. Accordingly, the PCRF 30 is provided with access to various types of information which are useful for generating network statistics. Such information can be obtained from other nodes using one or more of the interfaces of the PCRF 30. However, such information can also be available at the PCRF 30 itself, i.e., the PCRF 30 itself may be a valuable source of information for generating network statistics. Therefore, locating the network statistics generator 32 at the PCRF 30 allows for efficiently generating various types of network statistics. For example, the PCRF 30 can obtain transport-plane information to be used for generating a network statistic from the PCEF 34, the TDF 36, and/or the BBERF 39, can obtain application-plane information to be used for generating the network statistic from the AF 50, and can obtain user-plane information to be used for generating the network statistic from the repository 38. In an FMC scenario, the PCRF 30 could act as a converged policy controller, i.e., perform policy control also with respect to a fixed access network, and obtain information for generating the network statistic from the FAN 55.

In the illustrated embodiment, the network statistics generator 32 in the PCRF 30 can be used to provide complex network statistics which require combination of information from different network nodes. The PCRF 30 may coordinate these network nodes for the purpose of monitoring and reporting the respective information. The network statistics generator 32 may then compose the reports received from the network nodes to generate the network statistic which is reported to the NIF 60.

Further, due to its functionalities as a policy controller, the PCRF 30 has intelligence to determine in each situation which information is relevant and should be monitored. The PCRF 30 can dynamically select the types information to be obtained and select one or more of the other network nodes for providing these types of information. In this way, statically configuring network nodes to monitor information which is not always needed and resulting performance problems or other limitations of the individual network nodes, e.g., with respect to storing the monitored information, can be avoided. Also, the PCRF 30 can in each case decide whether establishing a session with a certain node is needed to obtain the information. For example, in some cases the PCRF 30 may already have established a session with a certain node to obtain information needed by the PCRF 30 to perform PCC decisions, and such information may also be used to generate the network statistics.

FIG. 2 schematically illustrates a process of generating network statistics in accordance with an embodiment of the invention. The illustrated process involves the PCRF 30, the NIF 60, a first node 21, and a second node 22. The first and second nodes 21, 22 can correspond to any of the elements interfaced to the PCRF 30 as illustrated in FIG. 1, e.g., the SGW 24 or BBERF 39, the PGW 26 or PCEF 34, the TDF 36, the repository 38, the OCS 44, the AF 50, or the FAN 55. The first and second nodes 21, 22 may also correspond to other types of nodes interfaced to the PCRF 30, which are not illustrated in FIG. 1.

As illustrated, the NIF 60 may contact the PCRF 30 to request one or more network statistics, by sending message 201 from to the PCRF 30. The message 201 may identify the type of network statistic to be generated, e.g., by including a corresponding statistics identifier. The PCRF 30 may acknowledge receipt of the message 201 by sending message 202 to the NIF 60. The message 202 may for example confirm whether the PCRF 30 is capable of generating a certain requested network statistic or not. At the PCRF 30, the request received with message 201 may define a set of network statistics to be generated and reported to the NIF 60.

Types of network statistics which can be requested and identified in the message 201 by a corresponding identifier may for example include:
- a number of subscribers registered to a certain service, e.g., an IMS service, using a certain RAT, e.g., access via E-UTRAN;
- a number of accesses to a certain service by subscribers located in certain area;
- a number of subscribers for which data traffic was accelerated while roaming;
- a number of accesses to a certain URL;
- a number of accesses to certain service;
- a number of sessions established for certain Access Point Name (APN);
- a number of active subscribers;
- a transferred downlink and/or uplink traffic volume, e.g., in terms of transferred uplink bytes, transferred downlink bytes, transferred uplink data packets, or transferred downlink data packets.

The interaction between the NIF 60 and the PCRF 30 may be repeated if necessary. For example, the NIF 60 could at some time decide to add or remove a certain network statistic from the set of network statistics to be generated and reported to the NIF 60. This may be accomplished by sending a new request to the PCRF 30 which identifies the network statistic to be added or removed from the set. Alternatively, the NIF 60 may also send a new request to the PCRF 30 to define a new set of network statistics to be generated and reported to the NIF 60.

As mentioned above, different types of network statistics may be identified in the interaction between the NIF 60 and the PCRF 30 by corresponding identifiers. The PCRF 30 may in turn be configured to relate the identifiers to information which allows for selecting one or more types of information to be obtained for generating a certain type of network statistics and for selecting one or more nodes as source of information. In the process of FIG. 2, the PCRF 30 accomplishes selection of one or more type of information to be obtained at step 203. Further, the PCRF 30 accomplishes selection of one or more nodes as source of information at step 204. Some examples of network statistics and corresponding selections of types of information and sources of information will be given in the following.

According to one example, a network statistic may represent the number of users belonging to a certain user profile which have accessed the mobile network in a certain area and time period while using a certain terminal type. In this case, the types of information to be obtained are users with this terminal type, which can be obtained from the PCEF 34 in terms of an International Mobile Equipment Identity (IMEI) of the user's terminal, and indications of accesses by these users in the area of interest, which can be obtained from the PCEF 34. On the basis of these indications, the PCRF 30 may increment a counter to count the number of accesses during the time period of interest.

According to a further example, a network statistic may represent a number of users simultaneously registered in IMS while using access via E-UTRAN. In this case, the types of information to be obtained are users with access via E-UTRAN, which can be obtained from the PCEF 34, and indications of these users registering or deregistering in IMS, which can be obtained from the AF 50. The PCRF 30 may increment a counter each time one of these users registers in IMS and decrement this counter when one of these users deregisters in IMS.

According to a further example, a network statistic may represent a number of accesses to a certain service by users located in certain area. In this case, the types of information to be obtained are users located in this area, which can be obtained from the PCEF 34, and indications of accesses to this service, which can be obtained from the TDF 36. On the basis of these indications, the PCRF 30 may increment a counter to count the number of accesses to the service.

According to a further example, a network statistic may represent a traffic volume, e.g., a number of uplink data packets, transferred while using an IMS service for users using certain terminal type. In this case, the types of information to be obtained are users with this terminal type, which can be obtained from the PCEF 34 in terms of an International Mobile Equipment Identity (IMEI) of the user's terminal, and using this IMS service, which can be obtained from the AF 50, and the traffic volume transferred by these users, which can be obtained from the PCEF 34 on a per-user basis. The PCRF 30 may aggregate the transferred traffic volumes of the different users.

According to a further example, a network statistic may represent a number of accesses to a certain service. In this case, the type of information to be obtained is indications of accesses to this service, which can be obtained from the TDF 36. On the basis of these indications, the PCRF 30 may increment a counter to count the number of accesses to the service by all users.

According to a further example, a network statistic may represent a number of IMS accesses while roaming which were authorized by the PCRF 30 considering user subscription conditions. In this case, the PCRF 30 may select to obtain application information from the IMS, e.g., the AF 50 which may be part of the IMS, roaming information from the PCEF 34, and authorization information from the PCRF 30 itself.

According to a further example, a network statistic may represent a number of IMS accesses while roaming that were not authorized by the PCRF 30 considering user subscription conditions. In this case, the PCRF 30 may select to obtain application information from the IMS, e.g., the AF 50 which may be part of the IMS, roaming information from the PCEF 34, and authorization information from the PCRF 30 itself.

According to a further example, a network statistic may represent a number of IMS accesses in certain area that were authorized by the PCRF considering the user subscription conditions and congestion information. In this case, the PCRF 30 may select to obtain application information from the IMS, e.g., the AF 50 which may be part of the IMS, congestion information from the PCEF 34, and authorization information from the PCRF 30 itself.

According to a further example, a network statistic may represent a number of IMS accesses in certain area that were not authorized by the PCRF considering the user subscription conditions and congestion information. In this case, the PCRF 30 may select to obtain application information from the IMS, e.g., the AF 50 which may be part of the IMS, location information from the PCEF 34, and authorization information from the PCRF 30 itself.

According to a further example, a network statistic may represent a number of IMS accesses using a certain type of RAT that were authorized by the PCRF considering the user subscription conditions and service characteristics, i.e., taking into account that depending on the service a certain access type is required. In this case, the PCRF 30 may select to obtain application information from the IMS, e.g., the AF 50 which may be part of the IMS, RAT type information from the PCEF 34, and authorization information from the PCRF 30 itself.

According to a further example, a network statistic may represent a number of IMS accesses using a certain type of RAT that were authorized by the PCRF considering the user subscription conditions and service characteristics, i.e., taking into account that depending on the service a certain access type is required. In this case, the PCRF 30 may select to obtain application information from the IMS, e.g., the AF 50 which may be part of the IMS, RAT type information from the PCEF 34, and authorization information from the PCRF 30 itself.

As can be seen from the above examples, the PCRF 30 can obtain different types of information to be used for generating the network statistics through interfaces as provided in the PCC architecture of FIG. 1. Further, in some of the above examples the selection of some types of information or sources of information depends on other information. For example, a group of users may be defined by information from the repository 38, and the PCRF 30 may then select nodes to be used for monitoring sessions of these users, which may for example include selecting certain PCEFs or TDFs involved in handling the sessions of these users.

In the process of FIG. 2, it is assumed that the first node 21 and the second node 22 are selected as sources of information. Accordingly, the PCRF 30 may request a first type of information from the first node 21 by sending message 205 to the first node 21. In the message 205, the PCRF 30 may for example specify the type of information to be reported. The first node 21 may acknowledge receipt of the message 205 by sending message 206 to the PCRF 30. Further, the PCRF 30 may request a second type of information from the second node 22 by sending message 207 to the second node 22. In the message 207, the PCRF 30 may for example specify the type of information to be reported. The second node 22 may acknowledge receipt of the message 207 by sending message 208 to the PCRF 30.

The first node 21 and the second node 22 may then take appropriate actions to provide the requested types of information. For example, if the first node 21 corresponds to the TDF 36, it may inspect data packets to provide the information, or if the second node corresponds to the PCEF 34, it may configure triggers to report certain events, e.g., as defined in section 6.1.4 of 3GPP 23.203. In the process of FIG. 2, the first node 21 reports the requested information by sending message 209 to the PCRF 30, and the second node 22 reports the requested information by sending message 210 to the PCRF 30.

As illustrated by step 211, the PCRF 30 may then generate the network statistics by compiling the information received from the first node 21 and the second node 22. The PCRF 30 may then report the generated network statistics to the NIF 60, which in the process of FIG. 2 is accomplished by sending message 212 to the NIF 60. The NIF 60 may acknowledge receipt of the message 212 by sending message 213 to the PCRF 30. Reporting of the network statistics by the PCRF 30 may be controlled in various ways, e.g., be accomplished after expiry of a certain time interval from receiving the message 201, be accomplished frequently at regular time intervals, i.e., according to a certain scan interval, be accomplished in response to comparing a monitored value to a threshold, or may be accomplished in response to a request from the NIF 60 to force immediate reporting.

Figure 3:
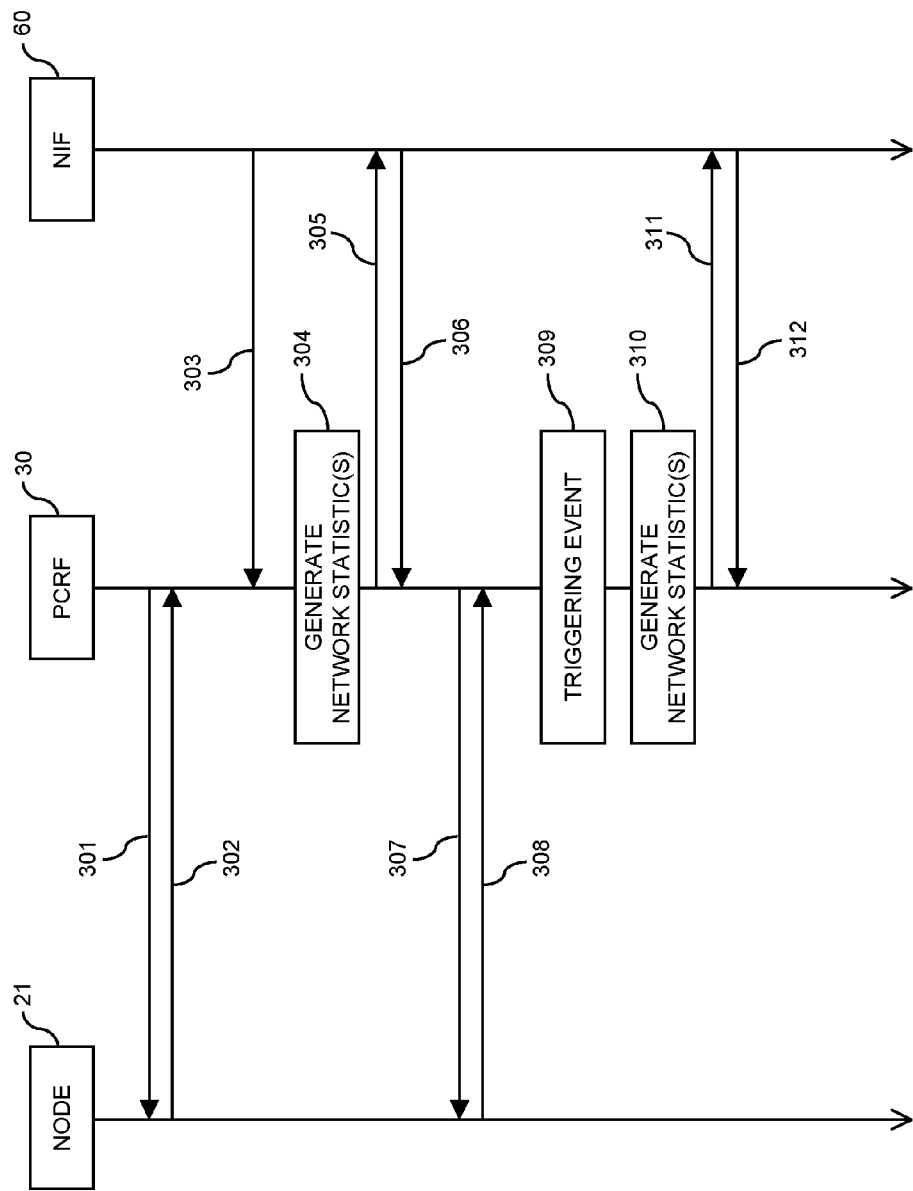
FIG. 3 shows a signaling diagram for illustrating a process of reporting network statistics according to an embodiment of the invention.

Some exemplary processes of reporting the network statistics are illustrated by the signaling diagram of FIG. 3. In FIG. 3, a node 21, the PCRF 30, and the NIF 30 are illustrated. The node 21 may correspond to any of the elements interfaced to the PCRF 30 as illustrated in FIG. 1, e.g., the SGW 24 or BBERF 39, the PGW 26 or PCEF 34, the TDF 36, the repository 38, the OCS 44, the AF 50, or the FAN 55. The nodes 21 may also correspond to some other type of node interfaced to the PCRF 30, which is not illustrated in FIG. 1.

Through messages 301, 302, the PCRF 30 obtains one or more types of information from the node 21 which are needed for generating a certain type of network statistic as requested by the NIF 60. With message 303, the NIF 60 requests immediate reporting of the network statistic.

In response to receiving message 303, the PCRF 30 generates the network statistic by compiling the obtained information, as illustrated by step 304, and reports the generated network statistic to the NIF 60 by sending message 305 to the NIF 60. The NIF 60 may acknowledge receipt of the message 305 by sending message 306 to the PCRF 30.

Irrespective of having reported the network statistic to the NIF 60, the PCRF 30 may continue monitoring operations for repeatedly generating the network statistic by repeatedly obtaining the same type of information from the node 21, as illustrated by messages 307 and 308. For example, the initial request from the NIF 60, such as with message 201 of FIG. 2, may have defined a reporting schedule on the basis of one or more triggering events. One example of such a triggering event is expiry of a timer. For example, the initial request from the NIF 60 may have defined reporting after a certain time interval or at regular time intervals. In this case, reporting of the network statistic could be triggered once or each time the timer expires. A further example of a triggering event is a monitored value reaching a threshold. For example, the PCRF 30 may monitor a number of transferred data packets, and reporting of the network statistic may be triggered by the number of transferred data packets exceeding a threshold number of data packets, e.g., as defined in the initial request from the NIF 60. The monitored value may be part of the reported statistic.

In the process of FIG. 3, the triggering event is illustrated to occur at step 309 which may also include detection of the triggering event by the PCRF 30. In response to detecting the triggering event, the PCRF 30 generates the network statistic by compiling the obtained information, as illustrated by step 310, and reports the generated network statistic to the NIF 60 by sending message 311 to the NIF 60. The NIF 60 may acknowledge receipt of the message 311 by sending message to the PCRF 30.

It is to be understood that the forced immediate reporting and the triggering-event based reporting of the network statistic as illustrated in the process of FIG. 3 could also be used independently from each other. Also, it is to be understood that in scenarios where the NIF 60 requests different types of network statistics from the PCRF 30, independent reporting mechanisms could be configured for each type of network statistic, e.g., using different triggering events, different scan intervals, or the like.

In the above described processes, different mechanisms may be applied by the PCRF 30 to obtain the selected types of information from the various nodes. For example, existing event reporting functions of certain nodes may be utilized. According to section 6.1.4 of 3GPP TS 23.203, such event reporting functions may be located at the PCEF 34, the TDF 36, and the BBERF 39. These event reporting functions operate on the level of IP-Connectivity Access Network (IP-CAN) sessions, i.e., can report events related to a certain IP-CAN session. The PCRF 30 may then coordinate the information related to different IP-CAN sessions in order to generate the network statistics.

In order to utilize the existing event reporting functions, the PCRF 30 may subscribe to new event triggers or remove armed event triggers. Depending on the type of node, this may be accomplished by using a Provision of PCC Rules procedure, a Provision of QoS Rules procedure, or a Provision of Application Detection and Control (ADC) Rules procedure as defined in 3GPP TS 23.203. The PCRF 30 may arm or disarm the event triggers considering the information that the PCRF 30 needs to obtain for generating the network statistics. In the following, some examples of using such event triggers will be explained by referring to event triggers as defined in Table 6.2 of 3GPP TS 23.203.

According to one example, the PCRF 30 may need to count the number of accesses to a certain service. In this case, the PCRF 30 may arm the event trigger "Start of application traffic detection" event trigger in the PCEF 34 or TDF 36. This will cause reporting to the PCRF 30 once a certain type of application traffic is detected. An identifier of the detected application may be included in the report to the PCRF 30. If this information is only relevant for users located in certain area, the PCRF 30 may also arm the "Location change" event trigger in the PCEF 34 or BBERF 39. In the latter case the "Start of application traffic detection" event trigger may be armed only for those users which are located in the certain area according to the information obtained by the PCRF 30 through the reports generated by the "Location change" event trigger.

According to a further example, the PCRF 30 may need to count the uplink traffic volume for a certain APN. In this case, it the PCRF 30 may arm the "Usage report" event trigger in the PCEF 34 or TDF 36 for in all IP-CAN sessions corresponding to this APN. In addition, the PCRF 30 may provide appropriate monitoring keys with associated usage quota to the PCEF 34 or TDF 36. If this information is for example only relevant for subscribers which are not roaming, the PCRF 30 may also arm the "PLMN change" event trigger in the PCEF 34. In the latter case, the "Usage report" event trigger may be armed only for users that are not roaming according to the information obtained by the PCRF 30 through the reports generated by the "PLMN change" event trigger, i.e., no usage of another operator's domain was reported.

In order to be able to arm the event triggers, re-authorization of ongoing IP-CAN sessions may be needed. Accordingly, signaling between the PCRF 30 and the node selected as source of information may also include a session reauthorization request for ongoing IP-CAN sessions, e.g., in messages 205, 207, 301, 307. The session reauthorization request may indicate subscription to or unsubscription from event triggers and/or modification, installation or removal of PCC rules, QoS rules, or ADC rules. Depending on the information to be obtained, the session reauthorization request can apply to one or multiple nodes involved in handling the IP-CAN session.

In some scenarios, e.g., for network statistics related to usage of a group of users fulfilling certain criteria, the PCRF 30 may be configured to provide corresponding usage counters. For example, the PCRF 30 may provide a usage counter to count the number of uplink data packets transferred when accessing using an IMS service with a certain terminal type. Such counters may accumulate the monitored values for a group of users. For the IP-CAN sessions of users fulfilling the criteria, the PCRF 30 may arm the "Usage report" event trigger in the PCEF 34 or TDF 36 and provide appropriate monitoring keys and associated usage quotas. On the basis, of the reports generated by the "Usage report" event trigger, the PCRF 30 may increment the usage counter.

Figure 4:
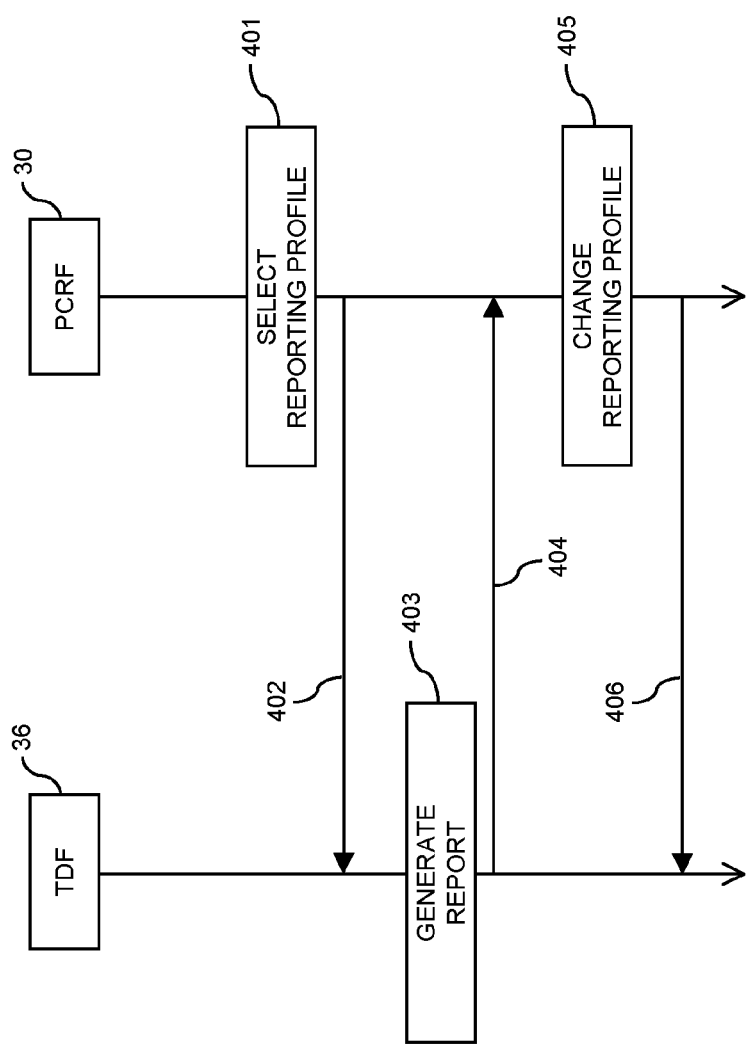
FIG. 4 shows a signaling diagram for illustrating a process of obtaining information as used in an embodiment of the invention.

In some embodiments, a reporting-profile based mechanism may be applied by the PCRF 30 to obtain the selected types of information from one or more of the nodes. In the following this will be explained by referring a process in which the PCRF 30 obtains information from the TDF 36 as illustrated in FIG. 4. However, it is to be understood that the reporting-profile based mechanism could also be applied with respect to other nodes.

In the reporting-profile based mechanism, the PCRF 30 selects a reporting profile from a plurality of reporting profiles and informs the node from which the information is to be obtained about the selected reporting profile, e.g., by identifying the reporting profile in a request for reporting the information. The node in turn may in turn be configured to control its reporting activity on the basis of the selected reporting profile.

In the process of FIG. 4, the PCRF 30 selects the reporting profile at step 401. This may be accomplished on a per user session basis according to certain selection criteria configured in the PCRF 30. Examples of such selection criteria will be explained in the following.

According to one example, a user category may be used as selection criterion. This may be suitable if information is only needed if the user belongs to a certain user category, e.g., Bronze, Silver, or Gold. An example of this is that the network statistic relates to Silver users that have accessed to a certain service for at least a certain number of times in a given time interval, e.g., during the last month.

According to a further example, the RAT type may be used as selection criterion. This may be suitable if information is only needed for users accessing with a certain RAT type. For example this can be useful for a network statistic to be used by the operator as a basis for decisions on investments in radio infrastructure.

According to a further example, the user location may be used as a selection criterion. This may be suitable if information related to users in a certain area is needed.

According to a further example, usage information may be used as a selection criterion. This may be suitable if information is needed which relates to for users that have transferred more traffic volume than certain limit during a certain period of type. This can be useful for network statistics to be used by the operator for monitoring what services or URLs used by certain users consume a large traffic volumes, e.g., to help in identifying fraud or abuse.

As illustrated by step 403, the TDF 36 generates a report with information requested by the PCRF 30. This is accomplished on the basis of the reporting profile indicated in the message 402. For example, if the indicated reporting profile defines to report the information on a per URL basis, the report may be generated accordingly. The TDF 36 may then send message 404 with the report to the PCRF 30.

As illustrated by step 405, the PCRF 30 may change the selected reporting profile, e.g., in response to receiving updated information from the NIF 60. The PCRF 30 may indicate the change of the selected reporting profile by sending a corresponding message, e.g., message 406 in the process of FIG. 4.

In order to implement the reporting-profile based reporting mechanism, the interface protocol between the PCRF 30 and the node from which the information is reported may be enhanced by the ability to convey the indication of the selected reporting profile from the PCRF 30 to the node. This may be achieved by adding a corresponding Attribute Value Pair (AVP) to certain protocol messages which includes a reporting profile identifier (RP-ID. Examples of reporting profile identifiers and corresponding reporting profiles are given below:

RP-ID=0: no reporting for the user session
RP-ID=1: reporting per detected service for the user session
RP-ID=2: reporting per detected service and per detected URL for the user session ···
RP-ID=N: full reporting for the user session Accordingly, the reporting profiles may be used to efficiently adapt the way of reporting to specific requirements.

In connection with the TDF 36, usage of the reporting profiles allows for using the TDF 36 not only to detect certain types of traffic, but also as an IP or DPI probe providing various types of information, e.g., in terms of number of hits, traffic volume, usage time, or the like, for various types of URLs or services. This can be achieved by configuring the TDF 36 to provide records per detected service or per detected URL, which can then be used as the basis of the report. Reporting from the TDF 36 can be accomplished periodically or be triggered by one or more configured triggering events, e.g., number of hits or reaching of a volume threshold. The TDF 36 may also use specific sampling techniques for generation of the information to be reported, which may allow to reduce the amount of traffic to be analyzed. For example, only processing packets with either odd or even destination IP addresses could be processed, thereby reducing the processing load while keeping enough statistical accuracy in the results obtained.

Figure 5:
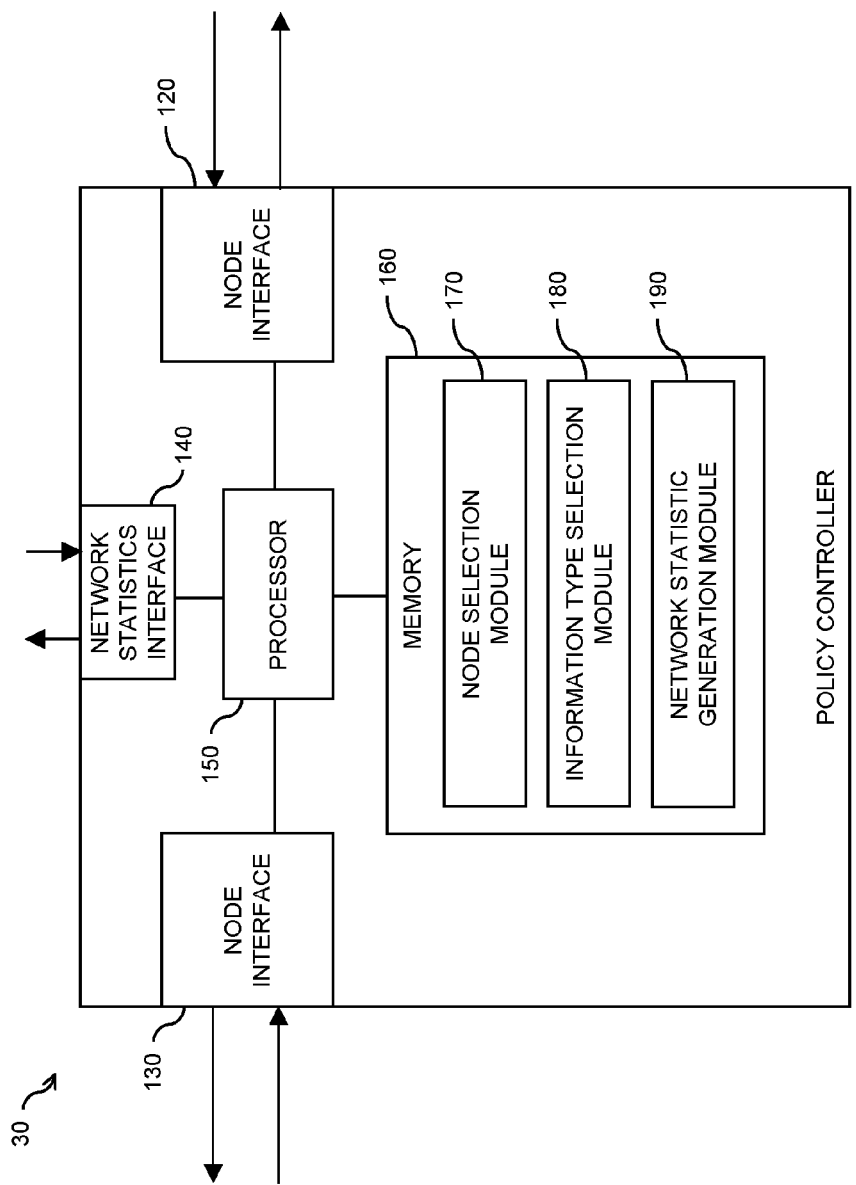
FIG. 5 schematically illustrates a policy controller according to an embodiment of the invention.

FIG. 5 further illustrates an exemplary implementation of a policy controller 30 according to an embodiment of the invention. The policy controller 30 may correspond to the policy controller as explained in connection with FIGS. 1-4 and may in particular be implemented as a PCRF.

In the illustrated example, the policy controller 30 includes a plurality of node interfaces 120, 130 and a network statistics interface 140. The node interfaces 120, 130 may be used for communication with various types of network nodes, such as gateway nodes, e.g., the SGW 24 or the PGW 26, traffic detection nodes, e.g., the TDF 36, AF nodes, e.g., the AF 50, subscriber database nodes, e.g., the repository 38, charging system nodes, e.g., the OCS 44, or a fixed access network node, e.g., the FAN 55. The network statistics interface 140 may be used for communication with a network intelligence function, e.g., the NIF 60. In a 3GPP PCC architecture as illustrated in FIG. 1, the node interfaces 120, 130 may be implement the Gx, Gxx, Rx, Sd, Sp, or Sy reference points or the RADIUS interface.

Further, the policy controller 30 includes a processor 150 coupled to the interfaces 120, 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the policy controller 30 for generating network statistics. More specifically, the memory 160 may include a node selection module 170 so as to implement the functionalities of selecting one or more nodes as source of information as described herein. Further, the memory 160 may include a control information type selection module 180 so as to implement functionalities of selecting a type of information to be obtained for generating the network statistics as described herein. Further, the memory 160 may include a network statistics generation module 190 so as to implement functionalities of compiling the network statistics from the obtained information and of reporting the generated network statistics as described herein.

It is to be understood that the structure as illustrated in FIG. 5 is merely schematic and that the policy controller 30 may actually include further components which, for the sake of clarity, are not illustrated, e.g., further interfaces. Also, some of the illustrated structures may be omitted. For example, one of the node interfaces 120, 130 could be omitted in some embodiments. Also, it is to be understood that the memory 160 may include further types of program code modules, which are not illustrated, e.g., program code modules for implementing known functionalities of a policy controller, e.g., filter generation or the like. According to some embodiments, also a computer program product may be provided for implementing concepts according to embodiments of the invention, e.g., a medium storing the program code to be stored in the memory 160.

Figure 6:
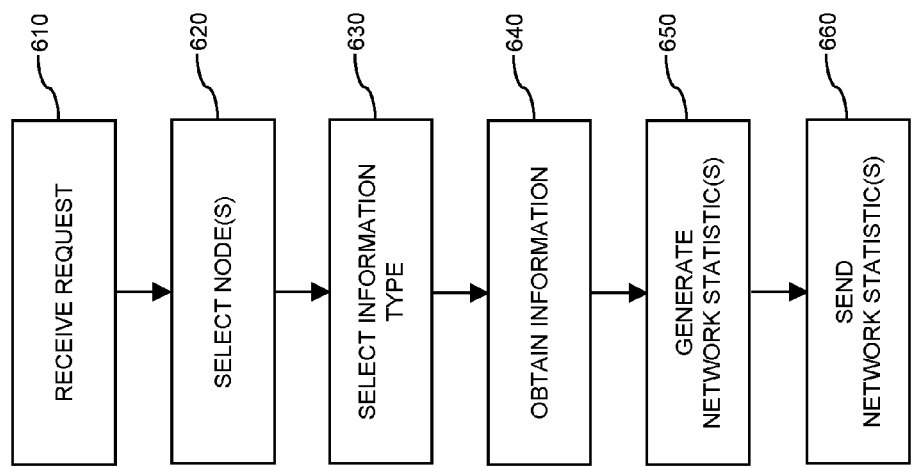
FIG. 6 shows a flowchart for schematically illustrating a method according to an embodiment of the invention.

FIG. 6 shows a flowchart for illustrating a method according to an embodiment of the invention. The method may be used in a mobile network and in particular be implemented in a policy controller of the mobile network, e.g., in the policy controller 30 of the PCC architecture as illustrated in FIG. 1.

At step 610, the policy controller receives a request for generating at least one network statistic. The request may identify a plurality of network statistics to be generated by the policy controller. The request may include one or more statistics identifiers to identify the requested network statistics, e.g., in the form of a list. The request may be received from a network intelligence function, e.g., the NIF 60 of FIGS. 1-3. The network statistics may represent a number of users registered for a certain service and using a certain radio access technology, a number of accesses to a certain service for users in a certain area, a number of users using traffic acceleration while roaming, a number of accesses to a certain network resource, a number of accesses to a certain service, a number of sessions established with respect to a certain gateway node, a number of active users, a transferred traffic volume, and/or a number of transferred data packets. Accordingly, the network statistic may pertain to a plurality of users.

At step 620, the policy controller selects at least one node from a plurality of nodes as source of information. Examples of such nodes include a gateway node, e.g., the SGW 24 or the PGW 26 of FIG. 1, a traffic detection node, e.g., a node including the TDF 36 of FIG. 1 or 4, an application function node, e.g., a node including the AF 50 of FIG. 1, a subscriber database node, e.g., a node including the repository 38 of FIG. 1, a charging system node, e.g., a node including the OCS 44 of FIG. 1, and a node of a fixed access network, e.g., the FAN 55 of FIG. 1. The policy controller may also determine information for generating the requested network statistic is available at the policy controller itself. In this case, the policy controller may select itself as source of information. This may be accomplished on the basis of the statistic identifier included in the request and/or on the basis of information stored at the policy controller, e.g., in the form of information relating a certain statistics identifier to a corresponding configuration of sources of information.

At step 630, the policy controller selects one or more type of information to be obtained. Again, this may be accomplished on the basis of the statistic identifier included in the request and/or on the basis of information stored at the policy controller, e.g., in the form of information relating a certain statistics identifier to a corresponding configuration of types of information to be obtained.

In some embodiments, the selection of a node as source of information and/or the selection of a type of information may depend on other information obtained by the policy controller. Accordingly, in some embodiments the policy controller may select one or more of the nodes as first source of information and obtain first information from these node or nodes selected as first source of information. The policy controller may then select the at least one node and/or the at least one type of information to be obtained for generating the network statistics on the basis of the obtained first information. For example, the policy controller may first obtain information from a subscriber database node, e.g., from the repository 38, to define a group of users, and may then select one or more gateway nodes, e.g., gateway nodes including a PCEF, to obtain information on user sessions of these users, e.g., indications of accesses, usage indications, location indications, or the like. Further, a traffic detection node, e.g., the TDF 36, could for the first time detect a certain type of traffic and the policy controller may then select to receive location information, e.g., from a gateway node including a PCEF such as the PGW 26, in order to track locations where this service is being used.

At step 640, the policy controller obtains the selected types of information from the node or nodes selected as source of information. In this connection, the policy controller may also decide whether to establish a session with the selected node. For example, in some scenarios the selected types of information from the node may already be available to the policy controller, e.g., from existing or previous sessions with the node. For obtaining the information, the policy controller may also select a reporting profile from a plurality of reporting profiles and send a reporting request identifying the reporting profile to the node selected as source of information. More specifically, a reporting-profile based mechanism as explained in connection with FIG. 4 may be used.

At step 650, the policy controller generates the requested network statistic or network statistics on the basis of the information as obtained at step 640. This may involve coordinating and combining information obtained for a number of different user sessions.

At step 660, the policy controller sends a report including the generated network statistic or network statistics. The report is typically sent to the entity which issued the request of step 610, e.g., to the network intelligence function. The report may be sent in response to a triggering event, e.g., in response to a comparison with a threshold value. Alternatively, the report may be sent regularly, e.g., in accordance with a scan interval as defined in the request of step 610, or immediately in response to a request from the network intelligence function.

Accordingly, in embodiments as explained above, the PCRF may be provided with an interface towards a network intelligence function. The PCRF may be preconfigured to handle different types of network statistics. In order to generate these network statistics, the PCRF may compile information obtained from different nodes, including information from the PCRF itself. The PCRF may coordinate the generation of the network statistics with ongoing IP-CAN sessions. The PCRF may also be configured to coordinate the obtained information and store the relevant information. The PCRF may report the generated network statistics to the network intelligence function, which can be accomplished periodically, in response to a monitored value reaching a threshold is reached, or upon an explicit request from the network intelligence function. For network statistics representing to usage information, e.g., transferred traffic volume in terms of a number of uplink and/or downlink byte or in terms of a number of uplink and/or downlink data packets, the PCRF may provide and manage usage counters which accumulate the usage of a group of users for statistics purposes.

The interface between the PCRF and the network intelligence function, e.g., the Ni interface of FIG. 1, may support a network statistics request from the network intelligence function to the PCRF, a network statistics report transmitted from the PCRF to the network intelligence function, and optionally also a reporting request transmitted from the network intelligence function to the PCRF.

The network statistics request may contain a list of requested network statistics and associated information. The network statistics request may for example include one or more statistics identifiers for certain types of network statistics. The PCRF knows the statistics identifiers and can select types of information to be obtained and sources of information for generating the corresponding network statistic on the basis of the statistics identifiers. The network statistics request may also define a schedule for reporting the network statistics, e.g., in terms of triggering events or a scan interval. The network statistics request may also allow the addition, modification, or removal of network statistics from a set defined by a previously transmitted network statistics request. The network statistics report includes one or more of the requested network statistics. The reporting request forces the PCRF to immediately report one or more of the requested network statistics.

By using concepts of the above embodiments, the operator of the mobile network may efficiently obtain various types of network statistics which may then be used as a basis for business or network management decisions. For this purpose existing infrastructure and interfaces may be reused.

It is to be understood that the examples and embodiments as explained above are merely illustrative and susceptible to various modifications. For example, the concepts could be used in other types of mobile network than the illustrated 3GPP implementation. The concepts may also be applied in various types of FMC networks. Also, the concepts may be applied in connection with various types of nodes coupled to the policy controller, which may be different from the above-mentioned examples of nodes. Further, it is to be understood that the above concepts may be implemented by using correspondingly designed software to be executed by a processor of an existing device, or by using dedicated device hardware.

The invention claimed is:

1. A method of operation by a network node in a mobile telecommunications network, the method comprising:
receiving a request from a requesting node in the mobile telecommunications network to generate a specified type of network statistic corresponding to one or more aspects of operational performance of the mobile telecommunications network;
identifying, based on the specified type of network statistic to be generated, which types of information must be collected from which other nodes in the mobile telecommunications network, wherein the mobile telecommunications network includes a plurality of nodes of varying types, and wherein the varying types of nodes collect or have access to varying types of information reflecting the operational performance of the mobile telecommunications network;
obtaining collected information by collecting the identified types of information from the identified other nodes in the mobile telecommunications network;
generating a network statistic of the specified type, based on processing the collected information; and
sending the generated network statistic to the requesting node.

2. The method of claim 1, wherein the request includes a statistics identifier belonging to a plurality of defined statistics identifiers corresponding to different types of network statistics, and wherein the method includes determining the specified type of network statistic to be generated, based on the statistics identifier included in the request.

3. The method of claim 1, wherein, among a defined set of network statistics identifiers, each statistics identifier corresponds to a different type of network statistic, wherein the step of identifying which types of information must be collected from which other nodes for generation of the specified type of network statistic comprises receiving one of the statistics identifiers in the request, and accessing configuration information that relates each statistics identifier to the types of information and nodes involved in generating the corresponding type of network statistic.

4. The method of claim 1, wherein the step of identifying which types of information must be collected from which other nodes for generation of the specified type of network statistic is based at least in part on identifying network subscribers of interest or network traffic types of interest.

5. The method of claim 1, further comprising, for a given other node from which one or more types of information is to be collected for generation of the specified type of network statistic, deciding whether to establish a session with the given other node in dependence on determining whether the network node already has the one or more types of information to be collected from a previous session with the given other node, or can obtain the one or more types of information to be collected via an existing session between the network node and the given other node.

6. The method of claim 1, further comprising, for a given other node from which one or more types of information is to be collected for generation of the specified type of network statistic, selecting a reporting profile from a plurality of defined reporting profiles, each reporting profile configured for reporting activity by a reporting node, and sending the reporting profile to the given other node, to control reporting of the given other node of the one or more types of information.

7. The method of claim 1, wherein the other nodes include any combination of: a policy controller node, a gateway node, a traffic detection node, an application function node, a subscriber database node, a charging system node, and a node of a fixed access network.

8. The method of claim 1, wherein the network node operates as a Policy Controller in the mobile telecommunications network, and wherein the request originates from another network node configured as a Network Intelligence Function (NIF), said Policy Controller configured to provide network control within the mobile telecommunications network regarding detection of service data flows, flow-based charging, and Quality-of-Service (QoS).

9. A network node configured for operation in a mobile telecommunications network, the network node comprising:
interface circuitry configured for inter-node communications within the mobile telecommunications network; and
processing circuitry operatively associated with the interface circuitry and configured to:
receive a request from a requesting node in the mobile telecommunications network to generate a specified type of network statistic corresponding to one or more aspects of operational performance of the mobile telecommunications network;
identify, based on the specified type of network statistic to be generated, which types of information must be collected from which other nodes in the mobile telecommunications network, wherein the mobile telecommunications network includes a plurality of nodes of varying types, and wherein the varying types of nodes collect or have access to varying types of information reflecting the operational performance of the mobile telecommunications network;
obtain collected information by collecting the identified types of information from the identified other nodes in the mobile telecommunications network;
generate a network statistic of the specified type, based on processing the collected information; and
send the generated network statistic to the requesting node.

10. The network node of claim 9, wherein the request includes a statistics identifier belonging to a plurality of defined statistics identifiers corresponding to different types of network statistics, and wherein the processing circuitry is configured to determine the specified type of network statistic to be generated, based on the statistics identifier included in the request.

11. The network node of claim 9, wherein, among a defined set of network statistics identifiers, each statistics identifier corresponds to a different type of network statistic, wherein the processing circuitry is configured to identify which types of information must be collected from which other nodes for generation of the specified type of network statistic, based on receiving one of the statistics identifiers in the request and accessing configuration information that relates each statistics identifier to the types of information and nodes involved in generating the corresponding type of network statistic.

12. The network node of claim 9, wherein the processing circuitry is configured to identify which types of information must be collected from which other nodes for generation of the specified type of network statistic, based at least in part on identifying network subscribers of interest or network traffic types of interest.

13. The network node of claim 9, further comprising, for a given other node from which one or more types of information is to be collected for generation of the specified type of network statistic, the processing circuitry is configured to decide whether to establish a session with the given other node in dependence on determining whether the network node already has the one or more types of information to be collected from a previous session with the given other node, or can obtain the one or more types of information to be collected via an existing session between the network node and the given other node.

14. The network node of claim 9, wherein, for a given other node from which one or more types of information is to be collected for generation of the specified type of network statistic, the processing circuitry is configured to select a reporting profile from a plurality of defined reporting profiles, each reporting profile configured for reporting activity by a reporting node, and sending the reporting profile to the given other node, to control reporting of the given other node of the one or more types of information.

15. The network node of claim 9, wherein the other nodes include any combination of: a policy controller node, a gateway node, a traffic detection node, an application function node, a subscriber database node, a charging system node, and a node of a fixed access network.

16. The network node of claim 9, wherein the network node is configured to operate as a Policy Controller in the mobile telecommunications network, and to receive the request from another network node configured as a Network Intelligence Function (NIF), said Policy Controller configured to provide network control within the mobile telecommunications network regarding detection of service data flows, flow-based charging, and Quality-of-Service (QoS).

* * * * *